United States Patent
Hsu et al.

(10) Patent No.: US 8,414,159 B2
(45) Date of Patent: Apr. 9, 2013

(54) LIGHT COMBINATION DEVICE

(75) Inventors: Chun-Fa Hsu, Hsinchu (TW);
Chia-Chang Lee, Hsinchu (TW);
Keng-Han Chuang, Hsinchu (TW)

(73) Assignee: Young Optics Inc., Hsinchu Science Park (TW)

( * ) Notice: Subject to any disclaimer, the term of this patent is extended or adjusted under 35 U.S.C. 154(b) by 267 days.

(21) Appl. No.: 12/888,287

(22) Filed: Sep. 22, 2010

(65) Prior Publication Data
US 2011/0199763 A1  Aug. 18, 2011

(30) Foreign Application Priority Data
Feb. 12, 2010 (TW) .............................. 99104567 A

(51) Int. Cl.
*F21V 9/00* (2006.01)

(52) U.S. Cl.
USPC ............ 362/293; 362/231; 362/241; 362/247

(58) Field of Classification Search .................. 362/293, 362/231, 241, 243, 247, 240; 353/84
See application file for complete search history.

(56) References Cited

U.S. PATENT DOCUMENTS

| | | | |
|---|---|---|---|
| 7,083,304 B2 * | 8/2006 | Rhoads et al. | 362/293 |
| 7,212,344 B2 * | 5/2007 | Keuper et | 359/618 |
| 8,057,046 B2 * | 11/2011 | Hatanaka et al. | 353/31 |
| 2009/0190347 A1 | 7/2009 | Lanz | |

FOREIGN PATENT DOCUMENTS

| | | |
|---|---|---|
| TW | M317024 | 8/2007 |
| TW | 200819785 | 5/2008 |

* cited by examiner

*Primary Examiner* — Robert May
(74) *Attorney, Agent, or Firm* — Muncy, Geissler, Olds & Lowe, PLLC

(57) ABSTRACT

A light combination device includes a reflective element and a first color separating element. The reflective element guides first color light beams emitted from at least a first light source and a second light source to propagate in a first direction. The first light source and the second light source are differently positioned in a space. The first color separating element transmits the first color light beams and reflects second color light beams emitted from at least a third light source and a fourth light source. The third light source and the fourth light source are differently positioned in the space. The first color separating element has a coating curved surface, and a curvature of the coating curved surface is varied according to positions of the third light source and the fourth light source to guide the second color light beams to propagate in the first direction.

15 Claims, 4 Drawing Sheets

LIGHT COMBINATION DEVICE

BACKGROUND OF THE INVENTION a. Field of the Invention

The invention relates to a light combination device.

b. Description of the Related Art

Referring to FIG. 3, multiple light-emitting diodes are used as light sources. A red light-emitting diode (LED) 102R, a green LED 102G, and a blue LED 102B scattering in an illumination system 100 are respectively disposed on a first heat-dissipating element 104, a second heat-dissipating element 106, and a third heat-dissipating element 108. An emitting light beam of the red LED 102R passes through a dichroic mirror 112 and a dichroic mirror 114 in succession and then enters a light integration rod 116. The emitting light beam of the green LED 102G is reflected by the dichroic mirror 112, passes through the dichroic mirror 114, and then enters the light integration rod 116. The emitting light beam of the blue LED 102B is reflected by the dichroic mirror 114 and then enters the light integration rod 116. Though the above optical configuration may achieve the effect of mixing different light beams having their respective colors, it fails to mix light beams having an identical color but from multiple light sources differently positioned in space.

Referring to FIG. 4, Taiwan patent publication no. 200819785 discloses a light-consolidating device 200 that includes a reflective lamp cover 202, a lamp 204, a lamp 206, a light-condensing lamp cover 208 corresponding to the lamp 204, and a light-condensing lamp cover 212 corresponding to the lamp 206. The light-condensing lamp cover 208 and the light-condensing lamp cover 212 respectively guide emitting light beams of the lamp 204 and the lamp 206 to a focus 214 of the reflective lamp cover 202, and the reflective lamp cover 202 reflects incoming light beams focused on the focus 214 to allow the incoming light beams to propagate in an identical direction. Further, Taiwan patent no. M317024 discloses a backlight lamp using an arc reflector or a parabolic reflector to consolidate light beams. Also, US patent publication no. 20090190347 discloses a flooding light using a parabolic reflector to consolidate light beams. However, these designs merely disclose the way of combining light beams from multiple typical lamps but not the way of combining light beams propagating in a dichroic optic of an optical projection system.

BRIEF SUMMARY OF THE INVENTION

The invention provides a light combination device capable of combining light beams with different colors, and each of the light beams having an identical color is emitted from multiple light sources.

Other objects and advantages of the invention may be further illustrated by the technical features broadly embodied and described as follows.

In order to achieve one or a portion of or all of the objects or other objects, one embodiment of the invention provides a light combination device. The light combination device includes a reflective element and a first color separating element. The reflective element is suitable for guiding first color light beams emitted from at least a first light source and a second light source to propagate in a first direction, and the first light source and the second light source are differently positioned in a space. The first color separating element is suitable for transmitting the first color light beams and reflecting second color light beams emitted from at least a third light source and a fourth light source. The third light source and the fourth light source are differently positioned in the space. The first color separating element has a coating curved surface, and a curvature of the coating curved surface is varied according to positions of the third light source and the fourth light source to guide the second color light beams to propagate in the first direction.

According to another embodiment of the invention, a light combination device includes a first color separating element, a second color separating element, and a third color separating element. The first color separating element is suitable for reflecting first color light beams emitted from at least a first LED and a second LED and guiding the first color light beams to propagate in a first direction. The first LED and the second LED are differently positioned in a space. The first color separating element has a first coating curved surface, and a curvature of the first coating curved surface of the first color separating element is varied according to positions of the first LED and the second LED. The second color separating element is suitable for transmitting the first color light beams and reflecting second color light beams emitted from at least a third LED and a fourth LED, and the third LED and the fourth LED are differently positioned in the space. The second color separating element has a second coating curved surface, and a curvature of the second coating curved surface of the second color separating element is varied according to positions of the third LED and the fourth LED to guide the second color light beams to propagate in the first direction. The third color separating element is suitable for transmitting the first color light beams and the second color light beams and reflecting third color light beams emitted from at least a fifth LED and a sixth LED, and the fifth LED and the sixth LED are differently positioned in the space. The third color separating element has a third coating curved surface, and a curvature of the third coating curved surface of the third color separating element is varied according to positions of the fifth LED and the sixth LED to guide the third color light beams to propagate in the first direction.

In one embodiment, each of the first LED and the second LED comprises a green LED, each of the third LED and the fourth LED comprises a blue LED, and each of the fifth LED and the sixth LED comprises a red LED. The first color separating element reflects green light beams, the second color separating element reflects blue light beams and transmits the green light beams, and the third color separating element reflects red light beam and transmits the green light beams and the blue light beams.

In one embodiment, the first coating curved surface of the first color separating element comprises a first sub curved surface and a second sub curved surface symmetrically formed and having an identical curvature, the second coating curved surface of the second color separating element comprises a third sub curved surface and a fourth sub curved surface symmetrically formed and having an identical curvature, and the third coating curved surface of the third color separating element comprises a fifth sub curved surface and a sixth sub curved surface symmetrically formed and having an identical curvature.

The embodiment or the embodiments of the invention may have at least one of the following advantages. According to the above embodiments, light beams from multiple red LEDs, multiple green LEDs, and multiple blue LEDs are mixed up and then transmitted in an identical direction. Therefore, light beams with different colors are allowed to combine together, and the light beams having an identical color are emitted from multiple light sources differently positioned in the space.

Other objectives, features and advantages of the invention will be further understood from the further technological

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
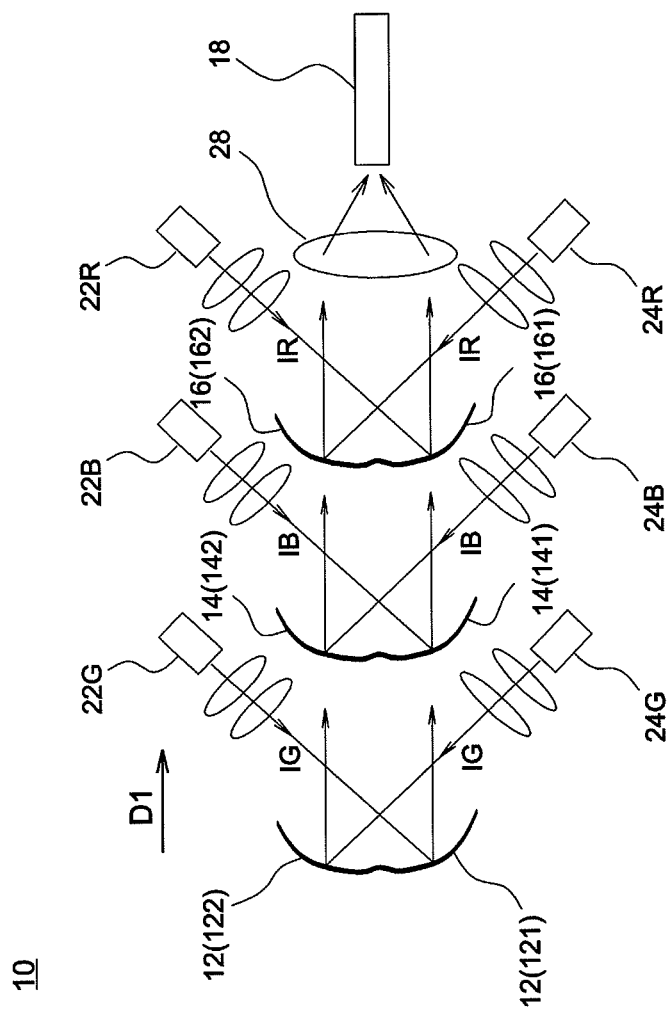
FIG. 1 shows a schematic diagram of a light combination device according to an embodiment of the invention.

Referring to FIG. 1, the light combination device 10 includes a first color separating element 12, a second color separating element 14, and a third color separating element 16. The first color separating element 12 is suitable for reflecting green light beams IG emitted from a first green light-emitting diode (LED) 22G and a second green LED 24G and guiding the green light beams IG to substantially propagate in a first direction D1. The first green LED 22G and the second green LED 24G are differently positioned in a space. For example, the first green LED 22G and the second green LED 24G are positioned on two sides of the first color separating element 12, as shown in FIG. 1. The first color separating element 12 has a coating curved surface, and the coating curved surface has a first sub curved surface 121 and a second sub curved surface 122. The first sub curved surface 121 and the second sub curved surface 122 are symmetrically formed and have an identical curvature. The first sub curved surface 121 of the first color separating element 12 corresponds to the first green LED 22G in position, and the first sub curved surface 121 is suitable for reflecting the green light beam IG from the first green LED 22G and guiding the green light beam IG to substantially propagate in the first direction D1. The second sub curved surface 122 of the first color separating element 12 corresponds to the second green LED 24G in position, and the second sub curved surface 122 is suitable for reflecting the green light beam IG from the second green LED 24G and guiding the green light beam IG to substantially propagate in the first direction D1.

The second color separating element 14 is suitable for transmitting the green light beams IG, reflecting blue light beams IB emitted from a first blue LED 22B and a second blue LED 24B, and guiding the blue light beams IB to propagate in the first direction D1. The first blue LED 22B and the second blue LED 24B are differently positioned in the space. For example, the first blue LED 22B and the second blue LED 24B are positioned on two sides of the second color separating element 14, as shown in FIG. 1. The second color separating element 14 has a coating curved surface, and the coating curved surface has a first sub curved surface 141 and a second sub curved surface 142. The first sub curved surface 141 and the second sub curved surface 142 are symmetrically formed and have an identical curvature. The first sub curved surface 141 of the second color separating element 14 corresponds to the first blue LED 22B in position. The first sub curved surface 141 of the second color separating element 14 is suitable for transmitting the green light beam IG, reflecting the blue light beam IB from the first blue LED 22B, and guiding the blue light beam IB to substantially propagate in the first direction D1. The second sub curved surface 142 of the second color separating element 14 corresponds to the second blue LED 24B in position. The second sub curved surface 142 of the second color separating element 14 is suitable for transmitting the green light beam IG, reflecting the blue light beam IB from the second blue LED 24B, and guiding the blue light beam IB to substantially propagate in the first direction D1.

The third color separating element 16 is suitable for transmitting the green light beams IG and the blue light beams IB, reflecting red light beams IR emitted from a first red LED 22R and a second red LED 24R, and guiding the red light beams IR to propagate in the first direction D1. The first red LED 22R and the second red LED 24R are differently positioned in space. For example, the first red LED 22R and the second red LED 24R are positioned on two sides of the third color separating element 16, as shown in FIG. 1. The third color separating element 16 has a coating curved surface, and the coating curved surface of third color separating element 16 has a first sub curved surface 161 and a second sub curved surface 162. The first sub curved surface 161 and the second sub curved surface 162 are symmetrically formed and have an identical curvature. The first sub curved surface 161 of the third color separating element 16 corresponds to the first red LED 22R in position. The first sub curved surface 161 of the third color separating element 16 is suitable for transmitting the green light beam IG and the blue light beam IB, reflecting the red light beam IR from the first red LED 22R, and guiding the red light beam IR to substantially propagate in the first direction D1. The second sub curved surface 162 of the third color separating element 16 corresponds to the second red LED 24R in position. The second sub curved surface 162 of the third color separating element 16 is suitable for transmitting the green light beam IG and the blue light beam IB, reflecting the red light beam IR from the second red LED 24R, and guiding the red light beam IR to substantially propagate in the first direction D1.

According to the above embodiment, light beams from multiple red LEDs 22R and 24R, multiple green LEDs 22G and 24G and multiple blue LEDs 22B and 24B are mixed up and transmitted to a relay lens 28 and further to a light integration rod 18. Therefore, light beams IG, IB and IR with different colors are allowed to combine together, where light beams having an identical color are emitted from multiple light sources differently positioned in space.

Figure 2:
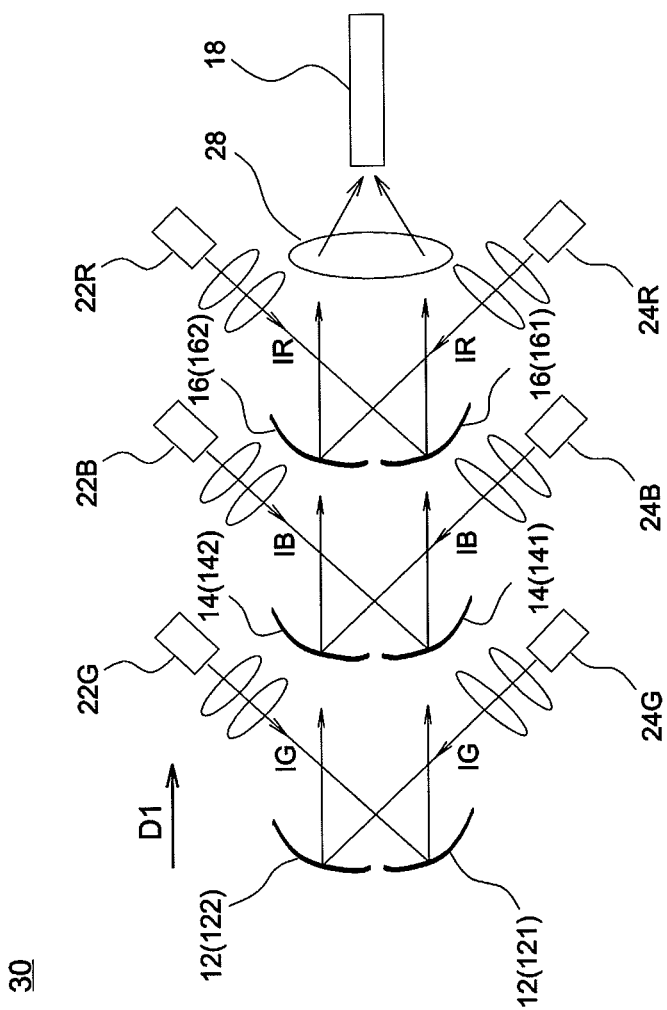
FIG. 2 shows a schematic diagram of a light combination device according to another embodiment of the invention.
Figure 3:
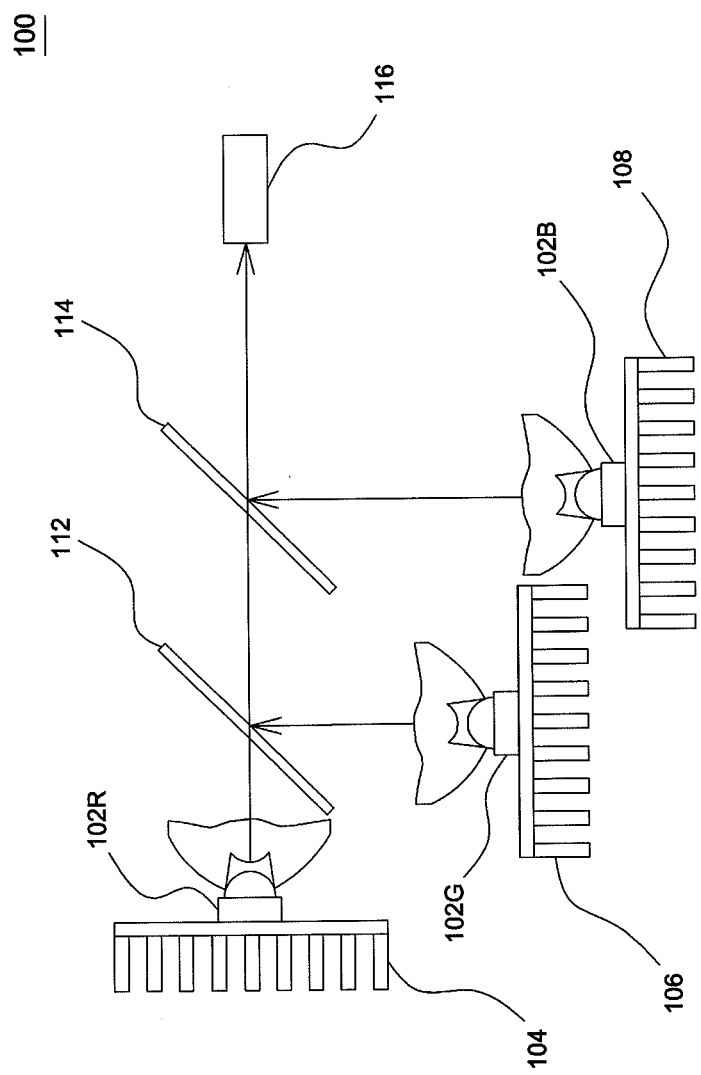
FIG. 3 shows a schematic diagram of a conventional illumination system.
Figure 4:
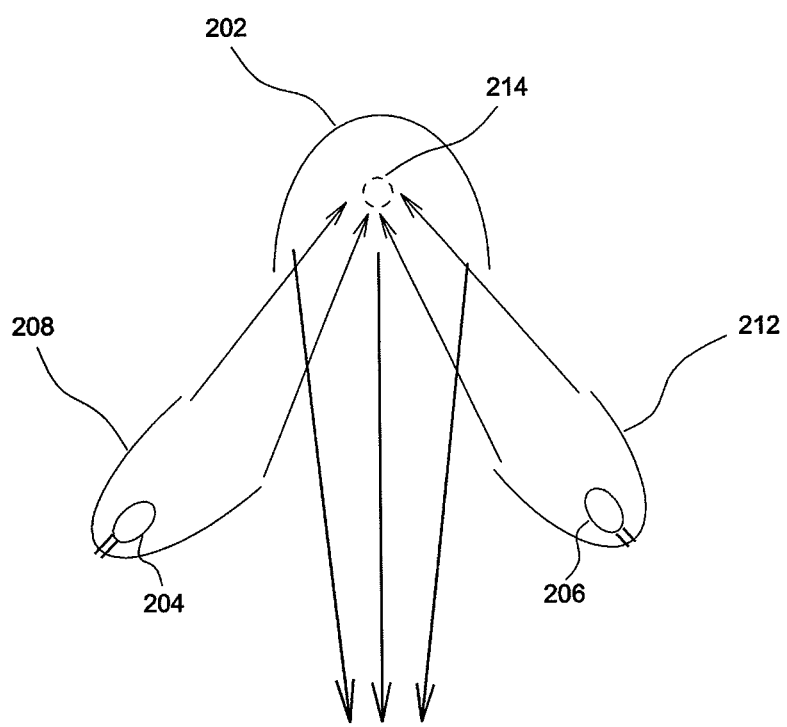
FIG. 4 shows a schematic diagram of a conventional light-consolidating device.

Referring to FIG. 1, the first sub curved surface 141 and the second sub curved surface 142 that are symmetrically formed and have an identical curvature are connected with each other as a single piece. However, the feature mentioned above is not limited. For example, as shown in FIG. 2, in the light combination device 30, two sub curved surfaces having an identical curvature are provided as two separated pieces. In an alternate embodiment, the first color separating element 12 is replaced by a reflective element capable of reflecting green light beams IG and guiding the green light beams IG to substantially propagate in the first direction D1. Further, the light combination device 10 may use different kinds and numbers of light sources and is not limited in using multiple red LEDs, green LEDs, and blue LEDs shown in the above embodiments. In addition, the sequence of different color light beams incident to the light combination device 10 is not limited. Besides, the shape of each coating curved surface of the color separating element is not limited, as long as the curvature of each coating curved surface is allowed to correspond to the positions of light sources to guide different color light beams to propagate in an identical direction. For example, each coating curved surface may have an arc surface, a parabolic surface, or an irregular curved surface.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light combination system, comprising:
    at least a first light source and a second light source suitable for emitting first color light beams;
    at least a third light source and a fourth light source suitable for emitting second color light beams;
    a reflective element suitable for guiding the first color light beams emitted from at least the first light source and the second light source to propagate in a first direction, wherein the first light source and the second light source are positioned on two sides of the reflective element and face an identical surface of the reflective element; and
    a first color separating element suitable for transmitting the first color light beams and reflecting the second color light beams emitted from at least the third light source and the fourth light source, wherein the third light source and the fourth light source are positioned on two sides of the first color separating element, the first color separating element has a coating curved surface, the third light source and the fourth light source face the coating curved surface, and a curvature of the coating curved surface is varied according to positions of the third light source and the fourth light source to guide the second color light beams to propagate in the first direction.

2. The light combination system as claimed in claim 1, wherein the reflective element comprises a second color separating element.

3. The light combination system as claimed in claim 1, wherein each of the first light source, the second light source, the third light source, and the fourth light source comprises a light emitting diode.

4. A light combination system, comprising:
    at least a first LED and a second LED suitable for emitting first color light beams;
    at least a third LED and a fourth LED suitable for emitting second color light beams;
    at least a fifth LED and a sixth LED suitable for emitting third color light beams;
    a first color separating element suitable for reflecting the first color light beams emitted from at least the first LED and the second LED and guiding the first color light beams to propagate in a first direction, wherein the first LED and the second LED are positioned on two sides of the first color separating element, the first color separating element has a first coating curved surface, the first LED and the second LED face the first coating curved surface, and a curvature of the first coating curved surface of the first color separating element is varied according to positions of the first LED and the second LED;
    a second color separating element suitable for transmitting the first color light beams and reflecting the second color light beams emitted from at least the third LED and the fourth LED, wherein the third LED and the fourth LED are positioned on two sides of the second color separating element, the second color separating element has a second coating curved surface, the third LED and the fourth LED face the second coating curved surface, and the curvature of the second coating curved surface of the second color separating element is varied according to positions of the third LED and the fourth LED to guide the second color light beams to propagate in the first direction; and a third color separating element suitable for transmitting the first color light beams and the second color light beams and reflecting the third color light beams emitted from at least the fifth LED and the sixth LED, wherein the fifth LED and the sixth LED are positioned on two sides of the third color separating element, the third color separating element has a third coating curved surface, the fifth LED and the sixth LED face the third coating curved surface, and a curvature of the third coating curved surface of the third color separating element is varied according to positions of the fifth LED and the sixth LED to guide the third color light beams to propagate in the first direction.

5. The light combination system as claimed in claim 4, wherein each of the first LED and the second LED comprises a green LED, each of the third LED and the fourth LED comprises a blue LED, and each of the fifth LED and the sixth LED comprises a red LED.

6. The light combination system as claimed in claim 4, wherein the first color separating element reflects green light beams, the second color separating element reflects blue light beams and transmits the green light beams, and the third color separating element reflects red light beam and transmits the green light beams and the blue light beams.

7. The light combination system as claimed in claim 4, wherein the first coating curved surface of the first color separating element comprises a first sub curved surface and a second sub curved surface symmetrically formed and having an identical curvature, the first sub curved surface of the first color separating element reflects the first color light beams from the first LED, and the second sub curved surface of the first color separating element reflects the first color light beams from the second LED.

8. The light combination system as claimed in claim 7, wherein each of the first sub curved surface and the second sub curved surface of the first color separating element comprises at least one of an arc surface, a parabolic surface, and an irregular curved surface.

9. The light combination system as claimed in claim 7, wherein the first sub curved surface and the second sub curved surface of the first color separating element are connected with each other as a single piece or two separated pieces.

10. The light combination system as claimed in claim 4, wherein the second coating curved surface of the second color separating element comprises a third sub curved surface and a fourth sub curved surface symmetrically formed and having an identical curvature, the third sub curved surface of the second color separating element reflects the second color light beams from the third LED, and the fourth sub curved surface of the second color separating element reflects the second color light beams from the fourth LED.

11. The light combination system as claimed in claim 10, wherein each of the third sub curved surface and the fourth sub curved surface of the second color separating element comprises at least one of an arc surface, a parabolic surface, and an irregular curved surface.

12. The light combination system as claimed in claim 10, wherein the third sub curved surface and the fourth sub curved surface of the second color separating element are connected with each other as a single piece or two separated pieces.

13. The light combination system as claimed in claim 4, wherein the third coating curved surface of the third color separating element comprises a fifth sub curved surface and a sixth sub curved surface symmetrically formed and having an identical curvature, the fifth sub curved surface of the third color separating element reflects the third color light beams from the fifth LED, and the sixth sub curved surface of the third color separating element reflects the third color light beams from the sixth LED.

14. The light combination system as claimed in claim 13, wherein each of the fifth sub curved surface and the sixth sub curved surface of the third color separating element comprises at least one of an arc surface, a parabolic surface, and an irregular curved surface.

15. The light combination system as claimed in claim 13, wherein the fifth sub curved surface and the sixth sub curved surface of the third color separating element are connected with each other as a single piece or two separate pieces.

* * * * *